United States Patent Office 2,732,390
Patented Jan. 24, 1956

2,732,390

SALTS OF ORGANOSILANOLS

Harold A. Clark, Midland, Mich., assignor to Dow Corning Corporation, Midland, Mich., a corporation of Michigan No Drawing. Application September 9, 1954, Serial No. 455,087

3 Claims. (Cl. 260—448.2)

This invention relates to alkali metal salts containing methylene links between the silicon atoms.

Salts of organosilanols in which the silicon atoms are connected by oxygen atoms are known. These materials have been used for various uses including the treatment of surfaces to render them water repellent. Of the previously known salts the methylsilanol salts have heretofore proved to be the most commercially useful.

The applicant has found most unexpectedly that the salts hereinafter described give much better water repellency, particularly on masonry surfaces, than the heretofore known organosilanol salts. Thus, the primary object of this invention is to prepare new compositions of matter which are useful for rendering masonry water repellent.

The term "masonry" as used herein includes any siliceous construction material such as concrete, brick, cement blocks, stucco, asbestos shingles and stone.

This invention relates to salts of the formula

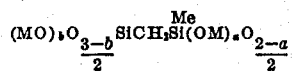

where M is an alkali metal, $b$ has a value from 1 to 3 inclusive and $a$ has a value from 1 to 2 inclusive.

The salts of this invention are best prepared by hydrolyzing the chlorosilcarbane of the formula

and thereafter treating the resulting siloxane gel with an alkali metal hydroxide. The chlorosilcarbane is obtained as a by-product of the reaction of methyl chloride with silicon. It is preferred that a water miscible solvent such as alcohol, dioxane and the like be used during the reaction with the alkali in order to hasten the solution of the siloxane. If desired, the salts may be recovered in dry form by evaporating the water and solvent.

For purposes of rendering materials water repellent the salts are best employed in 1 to 5 per cent aqueous solutions. These solutions are applied to the surface of the base material and then allowed to dry whereupon the surfaces are rendered water repellent.

As can be seen the salts of this invention can have 1 to 3 alkali metal atoms attached to the silicon atoms. In general, it is preferred to employ those having 1 alkali metal atom per silicon since such salts give superior water repellency. Examples of specific salts which are within the scope of this invention are

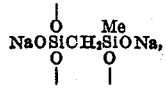 

and

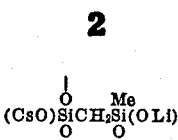

These salts may be used to render masonry or any other surface water repellent. Specific examples of other materials which can be made water repellent are organic fabrics, glass fiber, metal, wood, paper and soil.

The following example is illustrative only and should not be construed as limiting the invention which is properly delineated in the appended claims.

*Example*

1 mol of

was poured into a mixture of ice and water. A fine nontacky gel resulted. This was washed with water and dried overnight at 110° C. The gel was then dissolved in a mixture of 2 mols of NaOH in 160 g. of water and 50 g. of methanol. The mixture was heated at reflux to hasten solution of the gel. The resulting solution was diluted with water to give a solution containing 3% by weight of the salt.

The procedure was repeated using 4 mols of NaOH.

The resulting solutions were applied to cement cubes as follows: Each cube was dipped into the solution for 5 seconds, then air dried for 24 hrours at 50% relative humidity at 25° C. The cube was then weighed and immersed in a ¼" constant head of water for 24 hours. It was then taken out of the water and the excess moisture removed by blotting. The cube was then weighed and the gain in weight is recorded in the table below as percent water absorption. For comparison corresponding salts of monomethylsiloxane are shown.

| Salt | Percent water absorption |
|---|---|
| MeSiO(ONa) | 2.60 |
| MeSiO$_{1.5}$(ONa)$_{1.5}$ | 4.75 |
| (NaO)OSiCH$_2$Si(ONa)O$_{.5}$ (Me) | 0.63 |
| (NaO)$_2$O$_{.5}$SiCH$_2$Si(ONa)$_2$ (Me) | 1.60 |

These tests prove that the salts of this invention are about four times as efficient as the corresponding monomethylsiloxane salts. It also proves that the salts of this invention are eminently suitable for water repelling masonry surfaces.

That which is claimed is:

1. A salt of the formula

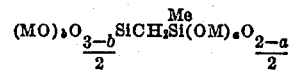

in which M is an alkali metal, $b$ has a value from 1 to 3 inclusive, and $a$ has a value from 1 to 2 inclusive.

2. (NaO)O SiCH$_2$SiO$_{.5}$(ONa). (Me)

3. (NaO)$_2$O$_{.5}$SiCH$_2$Si(ONa)$_2$. (Me)

References Cited in the file of this patent

UNITED STATES PATENTS

| 2,507,517 | Clark | May 16, 1950 |
| 2,592,682 | Goodwin | Apr. 15, 1952 |